United States Patent
Liu et al.

(10) Patent No.: US 11,128,212 B1
(45) Date of Patent: Sep. 21, 2021

(54) CURRENT RIPPLE REDUCTION FOR A DIRECT CURRENT SOURCE POWERING AN ALTERNATING CURRENT LOAD

(71) Applicant: The Boeing Company, Chicago, IL (US)

(72) Inventors: Shengyi Liu, Sammamish, WA (US); Eugene V. Solodovnik, Lake Stevens, WA (US); Frederic Lacaux, Woodinville, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 16/805,924

(22) Filed: Mar. 2, 2020

(51) Int. Cl.
*H02M 7/5387* (2007.01)
*H02M 1/15* (2006.01)
*H02P 27/06* (2006.01)
*H02M 7/537* (2006.01)

(52) U.S. Cl.
CPC .............. *H02M 1/15* (2013.01); *H02M 7/537* (2013.01); *H02P 27/06* (2013.01)

(58) Field of Classification Search
CPC .... H02M 1/15; H02M 7/537; H02M 7/53871; H02P 27/06
See application file for complete search history.

(56) References Cited

U.S. PATENT DOCUMENTS

| | | | |
|---|---|---|---|
| 5,852,554 A * | 12/1998 | Yamamoto | H02M 7/493 363/71 |
| 9,331,594 B2 | 5/2016 | Gu et al. | |
| 9,401,633 B2 | 7/2016 | Tang et al. | |
| 9,533,638 B2 | 1/2017 | Karimi et al. | |
| 2015/0236634 A1* | 8/2015 | Han | H02K 11/33 318/504 |
| 2016/0156291 A1* | 6/2016 | Becker | H02M 7/68 318/400.26 |
| 2017/0070175 A1* | 3/2017 | Butzmann | H02M 7/53871 |
| 2017/0110976 A1* | 4/2017 | Frampton | H02P 9/48 |

OTHER PUBLICATIONS

Burkard et al., "Control Concept for Parallel Interleaved Three-Phase Converters with Decoupled Balancing Control", EPE'2018 ECCE Europe, 2018.

(Continued)

*Primary Examiner* — Cortez M Cook
(74) *Attorney, Agent, or Firm* — Ostrager Chong Flaherty & Broitman P.C.

(57) ABSTRACT

Systems and methods for current ripple reduction for a direct current (DC) source powering an alternating current (AC) load. In accordance with one embodiment, the system and method involve interleaved operation of a 3×3-phase AC motor having multiple groups of windings. In accordance with another embodiment, the system and method involve interleaved operation of multiple co-shafted 3-phase AC motors. In accordance with a further embodiment, the system and method involve interleaved operation multiple 3-phase AC motors (not co-shafted) of the same level of power. The interleaved operation entails interleaved switching inside a set of inverters which are connected in parallel between a DC bus and the windings of the AC motor (motors).

20 Claims, 9 Drawing Sheets

(56) References Cited

OTHER PUBLICATIONS

Sowmiya et al., "IFOC of a Nine Phase Induction Motor Drive", Int'l J. Engineering Science and Innovative Technology, vol. 2, Issue 3, May 2013, pp. 72-78.
Wang et al., "A General Modelling Technique for a Triple Redundant 3×3-phase PMA SynRM", IEEE Trans. Industrial Electronics (2017).
Gohil et al., "Modified Discontinuous PWM for Size Reduction of the Circulating Current Filter in Parallel Interleaved Converters", IEEE Trans. Power Electronics, vol. 30, No. 7, Jan. 2014 (2017).
Avila et al., "Reconfigurable Parallel Interleaved Three-Phase Inverter for Aeronautical Applications", IEEE Proc. Electrical Systems for Aircraft, Railway and Ship Propulsion (2012).
Yang et al., "Research on Parallel Interleaved Inverters with Discontinuous Space-Vector Modulation", Energy and Power Engineering, 5, (2013), pp. 219-225.
Guepratte et al., "High Efficiency Interleaved Power Electronics Converter for Wide Operating Power Range", APEC 2009, Washington, United States (2209), pp. 413-419.

* cited by examiner

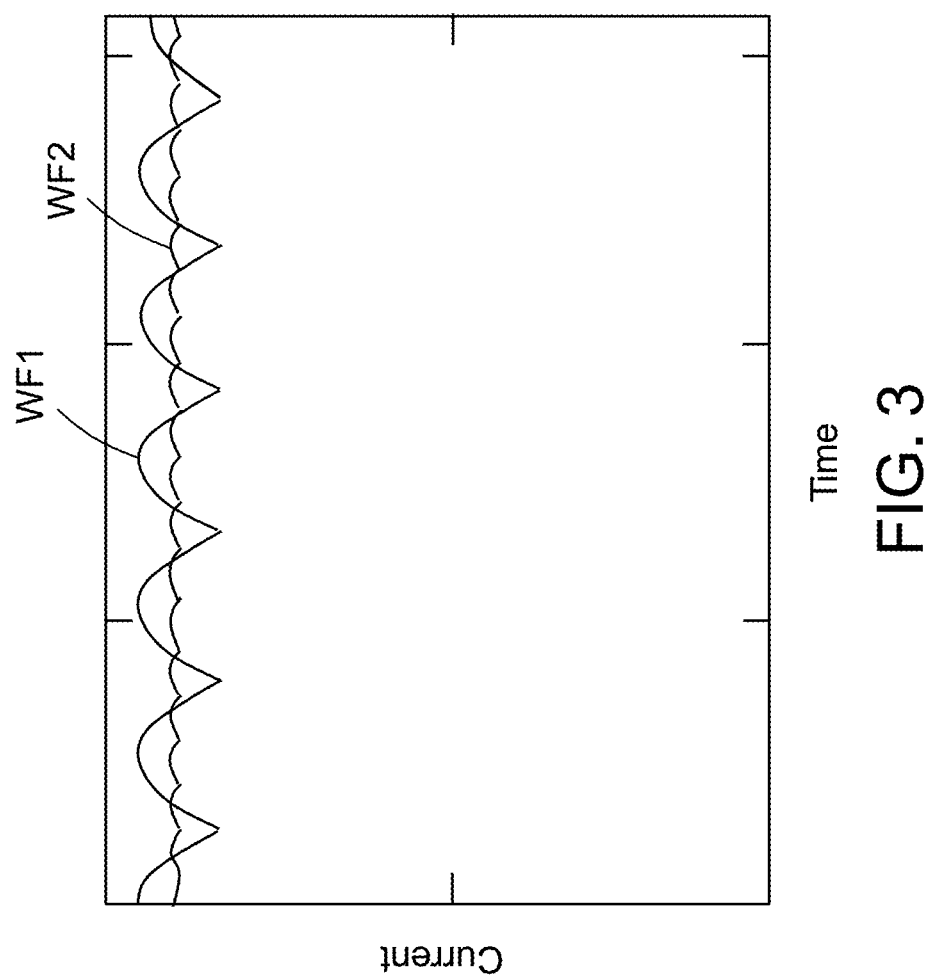

CURRENT RIPPLE REDUCTION FOR A DIRECT CURRENT SOURCE POWERING AN ALTERNATING CURRENT LOAD

BACKGROUND

The present disclosure generally relates to electrical power conversion systems and, in particular, to power conversion systems for converting direct current into alternating current. In particular, the present disclosure relates to a method and an apparatus for reducing the total number of components in order to reduce the overall weight, cost, and size of the conversion system.

One type of an electrical power conversion system (hereinafter "power conversion system") is a system of one or more devices used to convert direct current (DC) into alternating current (AC). In certain systems, a centralized power conversion system may be used to interface DC power sources with various DC and AC distribution buses. For example, aircraft power generation and distribution systems may use a centralized power conversion system to interface low-voltage DC power sources with various DC and AC distribution buses. A low-voltage DC power source may be, for example, a fuel cell, a battery pack, a solar panel, or some other type of power source.

A power conversion system may include, for example, a converter for increasing, or stepping-up, the voltage level of a low-voltage DC power source to form a high-voltage DC (HVDC) power source. As used herein, a converter is an electrical or electromechanical device used to change the voltage level of the DC current power source. As used in the aerospace industry and herein, the term "high voltage" in the context of direct current means any DC voltage higher than 500 $V_{DC}$.

The high-voltage DC current power source formed by the converter may then be fed to an inverter of the power conversion system to form a high-voltage AC power source. An inverter, as used herein, is an electrical or electromechanical device used to convert direct current into alternating current. Inverters may take various forms, including, but not limited to, single-phase inverters and three-phase inverters. Three-phase inverters (hereinafter "3-phase inverters) are used for variable-frequency drive applications and/or for high-power applications such as AC power transmission. A basic 3-phase inverter consists of three single-phase inverters each of which consists of two switches in series with the center point connected to one of the three load terminals. For the most basic control scheme, the operation of the six switches of the three phase legs is coordinated so that one switch operates at each 60 degree point of the fundamental output waveform. This creates a line-to-line output waveform that has six steps. The six-step waveform has a zero-voltage step between the positive and negative sections of the square wave such that the harmonics that are multiples of three are eliminated as described above. When carrier-based PWM techniques are applied to six-step waveforms, the basic overall shape, or envelope, of the waveform is retained so that the third harmonic and its multiples are cancelled. To construct inverters with higher power ratings, two six-step 3-phase inverters can be connected in parallel for a higher current rating or in series for a higher voltage rating. In either case, the output waveforms are phase shifted to obtain a 12-step waveform. If additional inverters are combined, an 18-step inverter is obtained with three inverters etc. Although inverters are usually combined for the purpose of achieving increased voltage or current ratings, the quality of the waveform is improved as well.

In all-electric or hybrid electric systems, an AC load, for example, a synchronous electric motor (hereinafter "motor") for either a propulsion or non-propulsion purpose, is commonly driven by an inverter which draws a DC current from a DC bus supplied and stabilized by one or more DC sources (typically non-ideal). Oftentimes, the current drawn by the inverter contains ripples (hereinafter "current ripples") which are detrimental to the DC source due to heat production and other adverse effects. A current ripple is a periodic non-sinusoidal waveform derived from an AC power source and characterized by high-amplitude narrow-bandwidth pulses. The pulses coincide with peak or near-peak amplitude of an accompanying sinusoidal voltage waveform. Depending upon switching schemes and system operation conditions, the magnitude of the current ripple varies. For a given system setup and inverter modulation method, the current ripple typically has a fixed pattern.

There are many ways to reduce the magnitude of a current ripple, but each way has a limitation. For example, a front filter (either passive or active) may be added, but the size of a passive filter size can be large for low-frequency current ripple filtering, whereas using an active filter complicates the system design and operation and adds weight and reliability issues. An alternative solution is to select an appropriate inverter switching modulation, such as pulse width modulation, space vector modulation, or phase shift modulation, but none of these modulation techniques can eliminate or achieve satisfactory reduction of current ripples.

A system and method for current ripple reduction of a DC source powering an AC load which improves upon the state of the art would be beneficial.

SUMMARY

The subject matter disclosed in some detail below is directed to systems and methods for current ripple reduction for a DC source during DC-to-AC power conversion for supplying AC power to an electric motor (hereinafter "AC motor") that is driven by alternating current. The systems and methods disclosed herein focus on the setup and operation of the AC load. In accordance with various embodiments, the system and method involve interleaved operation of: (1) a 3×3-phase AC motor having multiple groups of windings (hereinafter "embodiment"); (2) multiple co-shafted 3-phase AC motors (hereinafter "second embodiment"); or (3) multiple 3-phase AC motors (not co-shafted) of the same level of power (hereinafter "third embodiment"). The interleaved operation entails interleaved switching inside a set of inverters which are connected in parallel between a DC bus and the windings of the AC motor (motors). Depending upon the number of groups of windings in the 3×3-phase AC motor of the first embodiment or the number of 3-phase AC motors in the second and third embodiments, the interleaved operation method may vary.

As used herein, the term "interleaved operation" means interleaved switching inside inverters that produces AC power signals having interleaved waveforms. As used herein, the term "interleaved waveforms" means separately generated waveforms having the same shape and period, but differing in phase, which may be combined into a waveform in which, for example, the peaks of the separately generated waveforms alternate in time. In the context of this disclosure, interleaved waveforms are separately generated by inverters and then separately applied to different sets of windings (a.k.a. "coils"), not combined and applied to one set of windings.

Because of the independence of the interleaved operational method disclosed herein, the method generally applies to all inverter switching modulation schemes, as long as the same modulation scheme is used for all three phases of a motor or for all 3-phase AC motors. The method proposed herein does not rely on the setup of the front end or the condition of the DC sources. Therefore the method has a broad application for any DC source driving an AC load.

The benefits of the innovative technology disclosed herein include: (1) current ripple reduction or minimization for a DC source (for example, a battery, thereby extending the life of the battery); and (2) reduction of the front-end filter size, thereby reducing system weight, size, and complexity.

Although various embodiments of systems and methods for current ripple reduction for a DC source powering an AC load will be described in some detail below, one or more of those embodiments may be characterized by one or more of the following aspects.

One aspect of the subject matter disclosed in detail below is a system comprising a DC source, a DC bus connected to the DC source, a DC-to-AC converter connected to the DC bus, and an AC motor connected to the DC-to-AC converter, wherein: the AC motor comprises a stator, a first winding group at a first angular position on the stator, a second winding group at a second angular position on the stator different than first angular position, and a third winding group at a third angular position on the stator different than first and second angular positions; the DC-to-AC converter comprises first, second and third inverters connected to receive direct current from the DC bus; the three phases A, B, and C of the first inverter are connected, sequentially, to a first winding of the first winding group, to a first winding of the second winding group, and to a first winding of the third winding group; the three phases A, B and C of the second inverter are connected, sequentially, to a second winding of the first winding group, to a second winding of the second winding group, and to a second winding of the third winding group; and the three phases A, B, and C of the third inverter are connected, sequentially, to a third winding of the first winding group, to a third winding of the second winding group, and to a third winding of the third winding group. The inverters are configured by respective inverter controllers to output AC power signals having respective phases which are interleaved to reduce current ripple that may adversely impact the DC source.

Another aspect of the subject matter disclosed in detail below is a system comprising a DC source, a DC bus connected to the DC source, a DC-to-AC converter connected to the DC bus, and first, second, and third AC motors connected to the DC-to-AC converter, wherein: the first AC motor comprises a first stator and first, second, and third windings disposed at first, second, and third angular positions respectively on the first stator; the second AC motor comprises a second stator and first, second, and third windings disposed at first, second, and third angular positions respectively on the second stator; the third AC motor comprises a third stator and first, second, and third windings disposed at first, second, and third angular positions respectively on the third stator; the DC-to-AC converter comprises first, second, and third inverters connected to receive direct current from the DC bus; the first inverter is connected to the first, second, and third windings on the first stator; the second inverter is connected to the first, second, and third windings on the second stator; and the third inverter is connected to the first, second, and third windings on the third stator. The inverters are configured by respective inverter controllers to output AC power signals having respective phases which are interleaved to reduce current ripple that may adversely impact the DC source.

In accordance with one embodiment of the system described in the immediately preceding paragraph, the first, second, and third AC motors further comprise a common shaft; the first AC motor further comprises a first rotor mounted to the common shaft; the second AC motor further comprises a second rotor mounted to the common shaft; the third AC motor further comprises a third rotor mounted to the common shaft; and the common shaft is driven to rotate by electromagnetic inductive coupling of the first, second, and third rotors with the first, second, and third stators respectively.

In accordance with an alternative embodiment, the first AC motor further comprises a first shaft and a first rotor mounted to the first shaft, and the first rotor is driven to rotate by electromagnetic inductive coupling with the first stator; the second AC motor further comprises a second shaft and a second rotor mounted to the second shaft, and the second rotor is driven to rotate by electromagnetic inductive coupling with the second stator; and the third AC motor further comprises a third shaft and a third rotor mounted to the third shaft, and the third rotor is driven to rotate by electromagnetic inductive coupling with the third stator.

A further aspect of the subject matter disclosed in detail below is a method for providing AC power to a motor, the method comprising: connecting a DC source to a DC bus; connecting first through third inverters in parallel to the DC bus and to windings of first through third winding groups disposed at first, second and third angular positions respectively on a stator of a 3-phase AC motor disposed; controlling switches inside the first inverter to convert a DC power signal into first through third AC power signals having a same amplitude and shifted in phase by 120 degrees with respect to each other; supplying the first through third AC power signals to first, second and third windings respectively of the first winding group; controlling switches inside the second inverter to convert the DC power signal into fourth through sixth AC power signals having the same amplitude and shifted in phase by 120 degrees with respect to each other and by 40 degrees with respect to the first through third AC power signals; supplying the fourth through sixth AC power signals to first, second and third windings respectively of the second winding group; controlling switches inside the third inverter to convert the DC power signal into seventh through ninth AC power signals having the same amplitude and shifted in phase by 120 degrees with respect to each other, by 80 degrees with respect to the first through third AC power signals, and by 40 degrees with respect to the fourth through sixth AC power signals; and supplying the seventh through ninth AC power signals to first, second and third windings respectively of the third winding group.

Yet another aspect of the subject matter disclosed in detail below is a method for providing AC power to motors, the method comprising: connecting a DC source to a DC bus; connecting first through third inverters in parallel to the DC bus and to windings of first through third 3-phase AC motors respectively; controlling switches inside the first inverter to convert a DC power signal into first through third AC power signals having a same amplitude and shifted in phase by 120 degrees with respect to each other; supplying the first through third AC power signals to first, second and third windings respectively of the first 3-phase AC motor; controlling switches inside the second inverter to convert the DC power signal into fourth through sixth AC power signals having the same amplitude and shifted in phase by 120 degrees with respect to each other and by 40 degrees with respect to the first through third AC power signals; supplying the fourth through sixth AC power signals to first, second and third windings respectively of the second 3-phase AC motor; controlling switches inside the third inverter to convert the DC power signal into seventh through ninth AC power signals having the same amplitude and shifted in phase by 120 degrees with respect to each other, by 80 degrees with respect to the first through third AC power signals, and by 40 degrees with respect to the fourth through sixth AC power signals; and supplying the seventh through ninth AC power signals to first, second and third windings respectively of the third 3-phase AC motor. Optionally, the method further comprises mounting respective rotors of the first through third 3-phase AC motors to a common shaft.

Other aspects of systems and methods for current ripple reduction of a DC source powering an AC load are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

FIG. 3 is a graph showing current (vertical axis) versus time (horizontal axis) for current ripples produced at a DC bus by single 3-phase resistive loads (waveform WF1) and by three 3-phase resistive loads interleaved with a 769 phase angle (waveform WF2).

Reference will hereinafter be made to the drawings in which similar elements in different drawings bear the same reference numerals.

DETAILED DESCRIPTION

Illustrative embodiments of systems and methods for current ripple reduction for a DC source powering an AC load are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
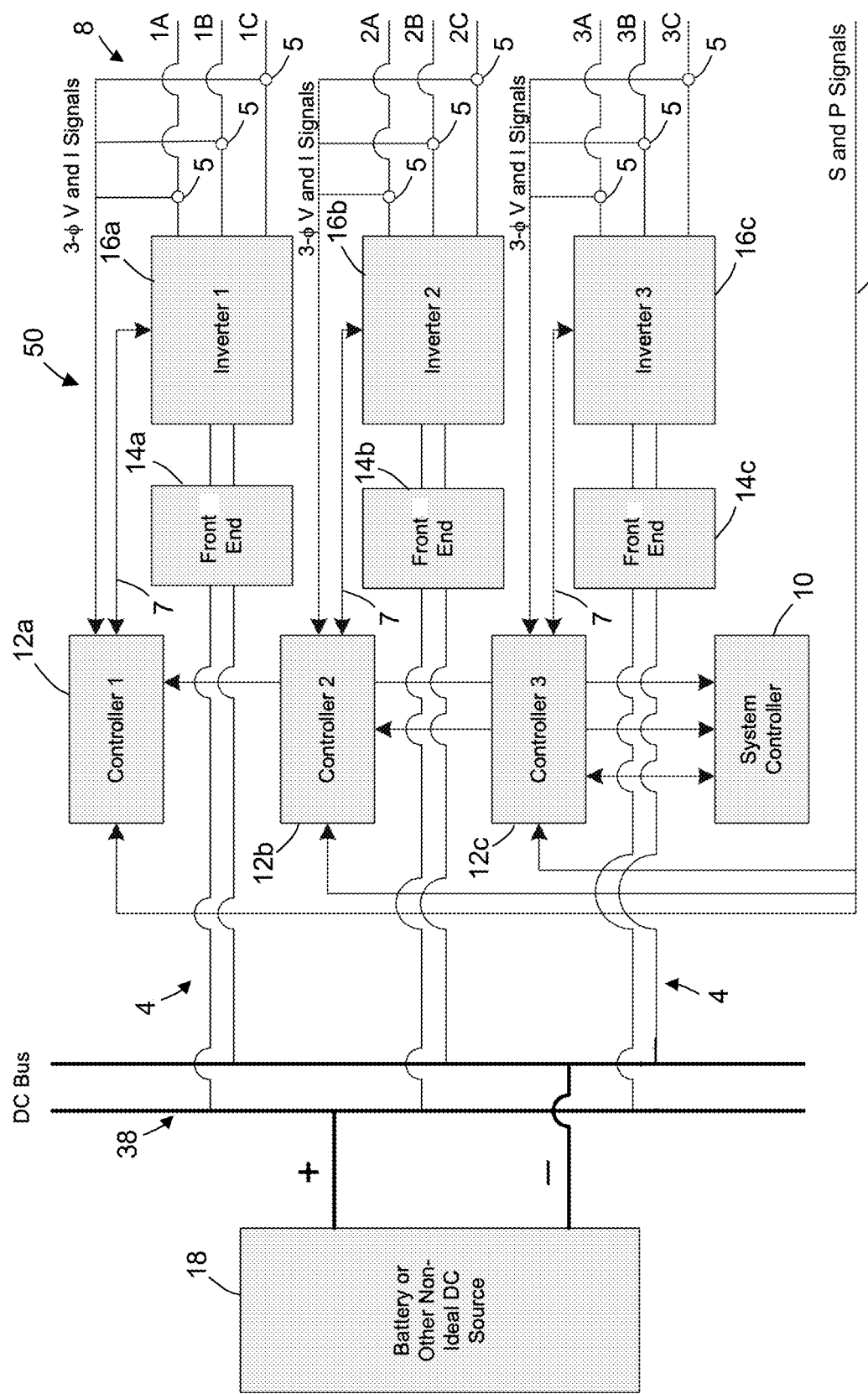
FIGS. 1A and 1B are respective interconnected parts of a diagram representing a system that includes a DC-to-AC converter for powering a 3×3-phase AC motor using interleaved switching of three parallel 3-phase inverters in accordance with the first embodiment.
Figure 1B:
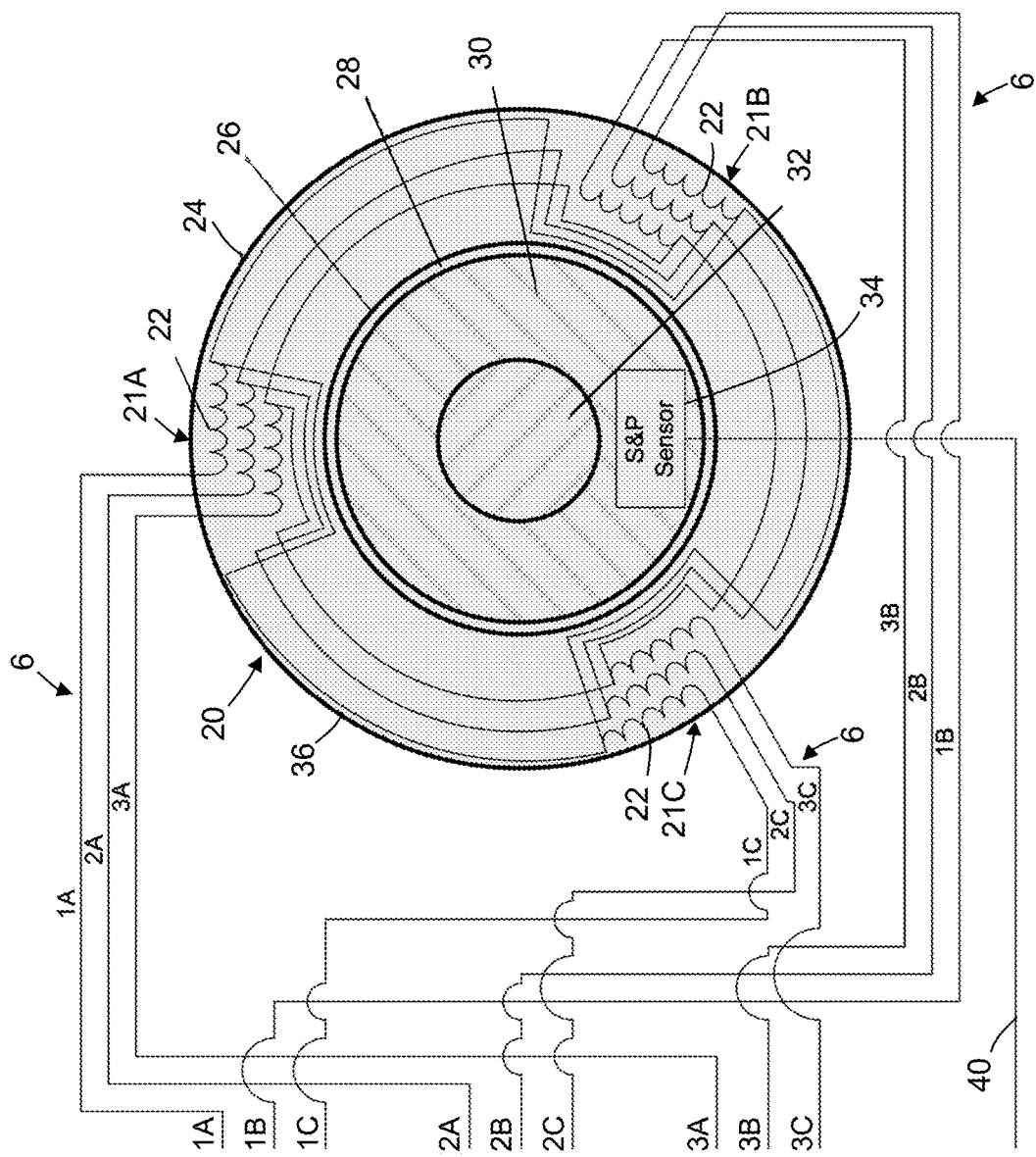

FIGS. 1A and 1B are respective interconnected parts of a diagram representing a system that includes a DC-to-AC converter 50 (seen in FIG. 1A) for powering a 3×3-phase AC motor 20 (seen in FIG. 1B) using a method of current ripple reduction in accordance with the first embodiment. The DC-to-AC converter 50 is connected to a DC bus 38. A DC power source 18 (e.g., a battery or other non-ideal DC power source) is also connected to the DC bus 38.

As seen in FIG. 1A, the DC-to-AC converter 50 includes a system controller 10 and three inverter controllers 12a-12c which are communicatively coupled to receive control signals from the system controller 10 and send feedback signals to the system controller 10. The system controller 10 performs a role of supervision and coordination for all inverter controllers 12a-12c. It also interfaces with a higher level controller. The operation of the DC source 18 may be controlled and managed by a control and management system and may interact with the system controller 10 (neither of which feature is shown in FIGS. 1A and 1B).

The DC-to-AC converter 50 further includes three front-end signal conditioning circuits 14a-14c (hereinafter "front-end circuits 14a-14c") which receive DC power signals from DC bus 38 via respective DC power lines 4. The DC-to-AC converter 50 further includes three 3-phase inverters 16a-16c (hereinafter "inverters 16a-16c") which receive conditioned DC power signals from the respective front-end circuits. The front-end circuits 14a-14c and the inverters 16a-16c are connected in parallel to the 3×3-phase AC motor 20. The operation of inverters 16a-16c is controlled by inverter controllers 12a-12c respectively, which send switch control signals to and receive switch state signals from the inverters 16a-16c via switch signal lines 7.

An inverter is a power electronic device or circuit that changes direct current to alternating current. In one simple inverter circuit, DC power is connected to a transformer through the center tap of the primary winding. A switch is rapidly switched back and forth to allow current to flow back to the DC source following two alternate paths through one end of the primary winding and then the other end. The alternation of the direction of current in the primary winding of the transformer produces alternating current in the secondary circuit. Transistors and other types of semiconductor switches may be incorporated into the inverter circuit design.

More specifically, the inverters 16a-16c may include a switch system, set of inductors, a set of capacitors, and an electromagnetic interference filter. The switch system may include different numbers of switches, depending on the type of inverter. Each of the switches may be implemented using, for example, without limitation, a bipolar transistor device, a metal-oxide semiconductor field-effect transistor (MOSFET) device, an insulated-gate bipolar transistor device, or some other type of semiconductor device or switching device.

In the embodiment depicted in FIGS. 1A and 1B, the inverter controllers 12a-12c control the operation (switching) of inverters 16a-16c so that the switching inside the inverters is interleaved. Inverters 16a-16c output respective sets of three AC power signals that have respective phase angles which differ by 120 degrees, which sets in turn have phase angles which differ by 40 degrees. The result is the production of nine AC power signals with respective phase angles that differ by 40 degrees. For example, inverter 16a may produce AC power signals that have respective phase angles of 0, 120 and 240 degrees, while inverter 16b produces AC power signals that have respective phase angles of 40, 160 and 280 degrees, and inverter 16c produces AC power signals that have respective phase angles of 80, 200 and 320 degrees. The modifier "interleaved" as used herein is referring to the fact that the inverters 16a-16c are switched in an alternating sequence to produce interleaved AC power signals in the following sequence: 1A→2A→3A→1B→2B→3B→1C→2C→3C (where the numbers 1, 2, and 3 respectively designate the three inverters 16a-16c and the letters A, B, and C respectively designate respective phases of the designated inverter).

As seen in FIG. 1B, the 3×3-phase AC motor 20 receives AC power from the inverters 16a-16c via AC power lines 6. The 3×3-phase AC motor 20 includes a rotor 30 mounted to a shaft 32 and a stator 36 separated from the rotor 30 by an air gap 28. The stator has an outer diameter 24 and an inner diameter 26. The stator 36 has a multiplicity of windings 22. More specifically, the windings 22 include three groups of windings 22 (hereinafter "winding groups 21A-21C"), which winding groups are arranged at respective angular positions on the stator 36. The rotor 30 has a multiplicity of windings (not shown in the drawings), or a permanent magnet array, which windings or permanent magnet array interact with the magnetic field produced by the stator windings to generate the forces that turn the shaft 32. The 3×3-phase AC motor 20 further includes a speed and position sensor 34 which detects the speed of rotation and position of the rotor 30 and sends speed and position signals 40 to inverter controllers 12a-12c.

More specifically, each of winding groups 21A-21C include windings which are respectively referred to herein as "first, second, and third windings". Thus, each of the winding groups 21A-21C includes first, second, and third windings which receive respective AC power signals having different phases from respective inverters 16a-16c. For the avoidance of indefiniteness, the first, second, and third windings of winding group 21A receive AC power signals having phases which are different than the phases of the AC power signals received by the first, second, and third windings of winding group 21B. Likewise, the first, second, and third windings of winding group 21B receive AC power signals having phases which are different than the phases of the AC power signals received by the first, second, and third windings of winding group 21C; and the first, second, and third windings of winding group 21A receive AC power signals having phases which are different than the phases of the AC power signals received by the first, second, and third windings of winding group 21C.

As seen in FIGS. 1A and 1B, the inverter 16a outputs 3-phase AC power signals 1A, 1B, and 1C which are respectively supplied to respective windings 22 of winding group 21A via respective AC power lines of a first subset of AC power lines 6; the inverter 16b outputs 3-phase AC power signals 2A, 2B, and 2C which are respectively supplied to respective windings 22 of winding group 21B via respective AC power lines of a second subset of AC power lines 6; and the inverter 16c outputs 3-phase AC power signals 3A, 3B, and 3C which are respectively supplied to respective windings 22 of winding group 21C via respective AC power lines of a third subset of AC power lines 6. In other words, three phases A, B, and C of the first inverter 16a are connected in sequence to respective first windings of the first, second, and third winding groups respectively; three phases A, B, and C of the second inverter 16a are connected in sequence to respective second windings of the first, second, and third winding groups respectively; and three phases A, B, and C of the third inverter 16c are connected in sequence to respective third windings of the first, second, and third winding groups respectively.

Figure 2:
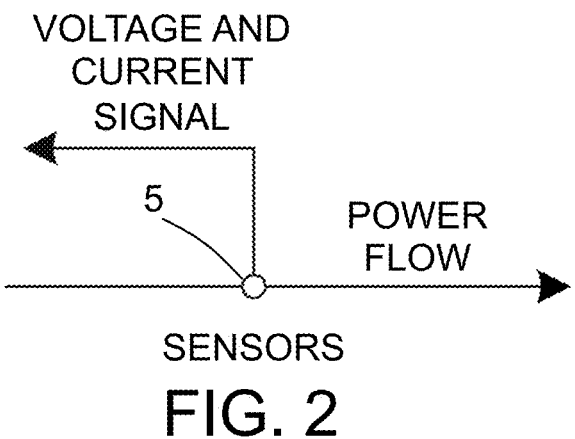
FIG. 2 is a diagram representing a pair of sensors for measuring the voltage and current of the AC power signals output by the inverters.
Figure 2A:
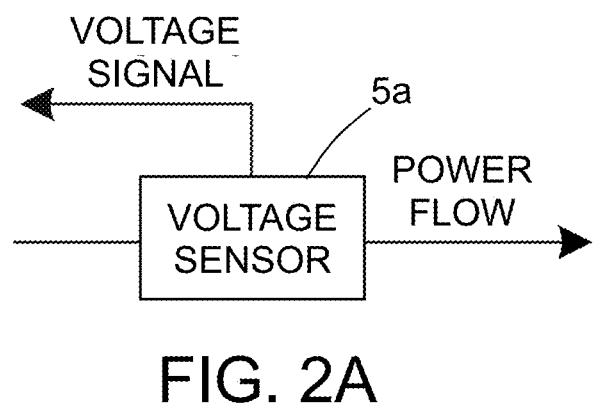
FIGS. 2A and 2B are diagrams respectively representing voltage and current sensors measuring the voltage and current of the AC power signals output by the inverters.
Figure 2B:
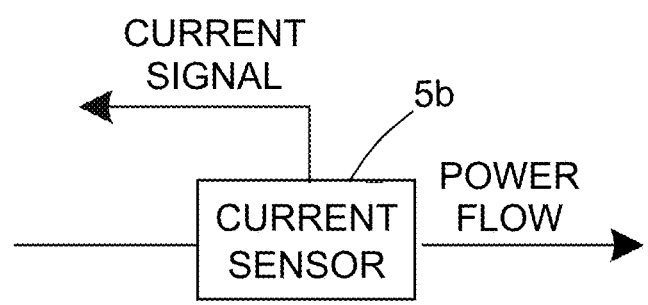

Referring again to FIG. 1A, the DC-to-AC converter 50 further includes a multiplicity of pairs of sensors 5 which measure the voltages and currents of the 3-phase AC power signals 1A-1C, 2A-2C, and 3A-3C respectively output by the inverters 16a-16c. Each pair of sensors 5 is represented by an open circle on a magnified scale in FIG. 2. The pair of sensors 5 includes a voltage sensor 5a for measuring the voltage of an AC power signal (as seen FIG. 2A) and a current sensor 5b for measuring the voltage of an AC power signal (as seen FIG. 2B). Typical voltage sensors may include: Hall effect sensors, resistive or capacitive voltage dividers, electronic sensors, etc.; typical current sensors include: Hall effect sensors, transformer type, resistor current sensors, electronic sensors, etc. The 3-phase voltage and current signals representing the measured voltage and current of the AC power signals output by inverter 16a are fed back to inverter controller 12a; the 3-phase voltage and current signals representing the measured voltage and current of the AC power signals output by inverter 16b are fed back to inverter controller 12b; and the 3-phase voltage and current signals representing the measured voltage and current of the AC power signals output by inverter 16c are fed back to inverter controller 12c. Thus, the feedback signals for each inverter controller consist of three voltages and three currents.

The inverter controllers 12a-12c are configured to control switching inside the inverters 16a-16c in accordance with an interleaved switching scheme that reduces current ripple. The method of current ripple reduction proposed herein is applicable to permanent magnet motors, induction motors, and synchronous motors. Therefore, no detail regarding rotor design is shown in the drawings since such details are not relevant here.

In addition, FIGS. 1A and 1B show how the stator windings interact with the control system to implement interleaved operation. The technology disclosed herein is not intended for use with any specific stator winding design. Each of the motor windings may represents n pairs of windings that are appropriately allocated, orientated, and dispersed on the stator, where n≥1. The motor stator windings can be concentrated or distributed. As a convention, each pair of 3-phase stator windings are Y-connected.

The 3×3-phase AC motor 20 shown in FIG. 1B is effectively a 9-phase AC motor (nine AC phases having the same amplitude and sequentially shifted by 40 degrees). The first group of windings 21A receives modulated AC power signals 1A, 1B, and 1C, consecutively separated by 120 degrees, similar to a typical single 3-phase AC motor. Note that distributed windings may be applied to the method disclosed herein, but FIG. 1B shows only concentrated windings for a matter of convenience. The second group of windings 21B receives modulated AC power signals 2A, 2B, and 2C; and the third group of windings 21C receives modulated AC power signals 3A, 3B, and 3C in a similar fashion. There is no physical phase shift (difference in angular position) among the windings in any one of winding groups 21A-21C.

The inverter topology does not affect the current ripple reduction method disclosed here. So the detailed inverter topology is ignored here. The current ripple reduction method requires that the three inverters 16a-16c possess the same types of devices and topology.

Similarly, all three inverter controllers 12a-12c are of the same type. The detailed controller construction is not important here. The controller functions as usual to control and regulate the voltages, currents, motor speed and torque, and other functions. These functional controls are independent from the interleaved operation of the motor winding groups or motors, which is also performed by the controllers.

The front-end circuits 14a-14c may comprise any one of or a combination of two or more of the following types of devices: a step-up or step-down converter, a filter network, a protective circuit, or a contactor. The essential component nature and circuit topology of the front-end circuits 14a-14c does not affect the current ripple reduction method disclosed herein.

The DC source or DC sources are typically non-ideal. The voltage and impedance of the DC source is usually subject to change during a mission cycle. A change of the terminal voltage or impedance may affect the ripple size for a given load condition, but such change does not impact the current ripple reduction effect produced by the technology proposed herein.

The principle of operation of the DC-to-AC converter 50 will now be described with reference to FIG. 3, which is a graph showing current (vertical axis) versus time (horizontal axis) for current ripples produced at a DC bus by single 3-phase resistive loads and by three 3-phase resistive loads interleaved with a π/9 phase angle. Under an ideal condition, a single 3-phase resistive load would draw a current at the DC bus 38 with six current ripple pulses within a 2π mechanical angle (assume a two-pole machine) as shown by waveform WF1 in FIG. 3. When three 3-phase loads draw an equivalent power, and if three groups of loads draw the current at an interleaved angle of π/9, the current at the DC bus 38 would have an 18-pulse ripple uniformly distributed across an angle of 2π, but with much smaller size, as shown by waveform WF2 in FIG. 3.

A non-ideal DC voltage waveform can be viewed as a composite of a constant DC component (offset) with an alternating (AC) voltage—the ripple voltage—overlaid. It can be shown that the ripple factor of a 6-pulse operation is 0.04 and the ripple factor of an 18-pulse operation is 0.005—a reduction by a factor of 10. The ripple factor RF is defined as $$RF = \frac{\sqrt{v_{rms}^2 - v_{avg}^2}}{v_{avg}}$$

where $v_{rms}$ is the root mean square voltage and $v_{avg}$ is the average voltage.

In practice, neither the source nor the load are ideal. In the case depicted in FIGS. 1A and 1B, the load is a motor and inductive, whereas the DC source may be a battery. Furthermore, the inverter switching may result in significant current ripple due to switching transients. However, for given source and load condition, one can expect that the ripple current will be reduced significantly if a motor of multiple 3-phase windings, as shown in FIG. 1B, operates in an interleaved fashion as compared to a single 3-phase AC motor operated at the same power level.

In general, for a motor having n 3-phase windings, the interleaved angle $\theta_{int}$ between each consecutive phase will be $$\theta_{int} = \frac{\pi}{3n}$$

This would produce a total of 2·3·n ripple pulses uniformly distributed across a period of 2π.

The above discussion is for the current ripple in an interleaved time scale which is in a low frequency range (motor operating frequency range). The current ripples at the DC bus 38 due to different phase currents can be effectively reduced using interleaved operation of multiple 3-phase currents.

Current ripples are also generated due to switching actions, for example, due to the pulse width modulation process, which switching is in a much higher frequency range. The high-frequency current ripples are superimposed on the DC side, which is also detrimental to DC sources.

In an interleaved operation of a motor of three 3-phase windings, all three inverter controllers and inverters are operated in accordance with the same switching modulation scheme, regardless of the specific modulation technique used. In this way, any switching actions that generate a voltage pulse in phase 1A will be followed by a second voltage pulse in phase 2A but inter-leaved by 769 degrees, and also followed by a third voltage pulse interleaved with the first pulse by 2769 degree.

Figure 4A:
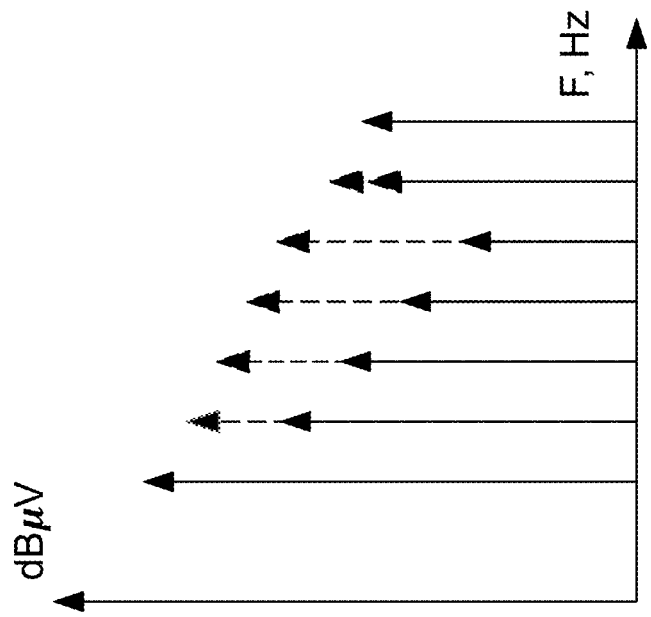
FIGS. 4A and 4B are high-frequency spectrum graphs showing that some harmonics are eliminated (indicated by dashed arrows in FIG. 4A) or the magnitudes of some harmonics are reduced (indicated by dashed arrows in FIG. 4B) by using interleaved switching of parallel 3-phase inverters.
Figure 4B:
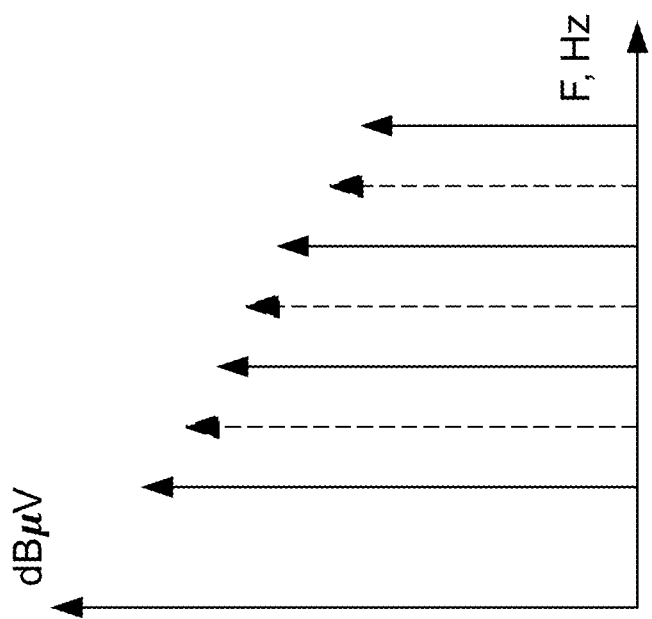

The effect of the interleaved switching sequence among three inverters described above is that some high-frequency harmonics can be eliminated or reduced. Additionally, the interleaved switching can be designed for eliminating or reducing some specific harmonics. FIGS. 4A and 4B are high-frequency spectrum graphs showing that some harmonics are eliminated (see dashed arrows in FIG. 4A) or the magnitudes of some harmonics are reduced (see dashed arrows in FIG. 4B) by using interleaved switching (interleaved modulation) of parallel 3-phase inverters.

Figure 5A:
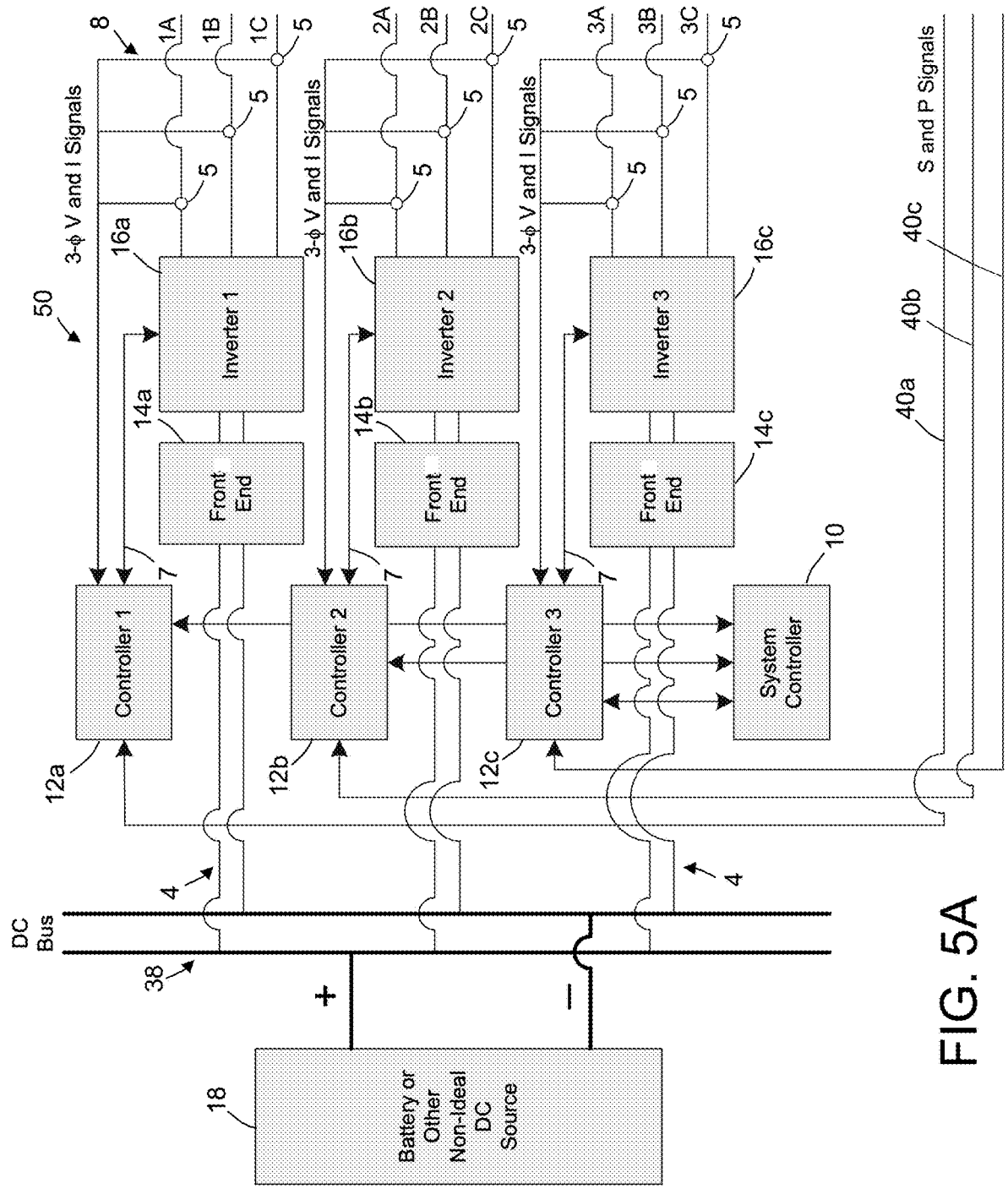
FIGS. 5A and 5B are respective interconnected parts of a diagram representing a system that includes a DC-to-AC converter for powering three co-shafted 3-phase AC motors using interleaved switching of three parallel 3-phase inverters in accordance with the second embodiment.
Figure 5B:
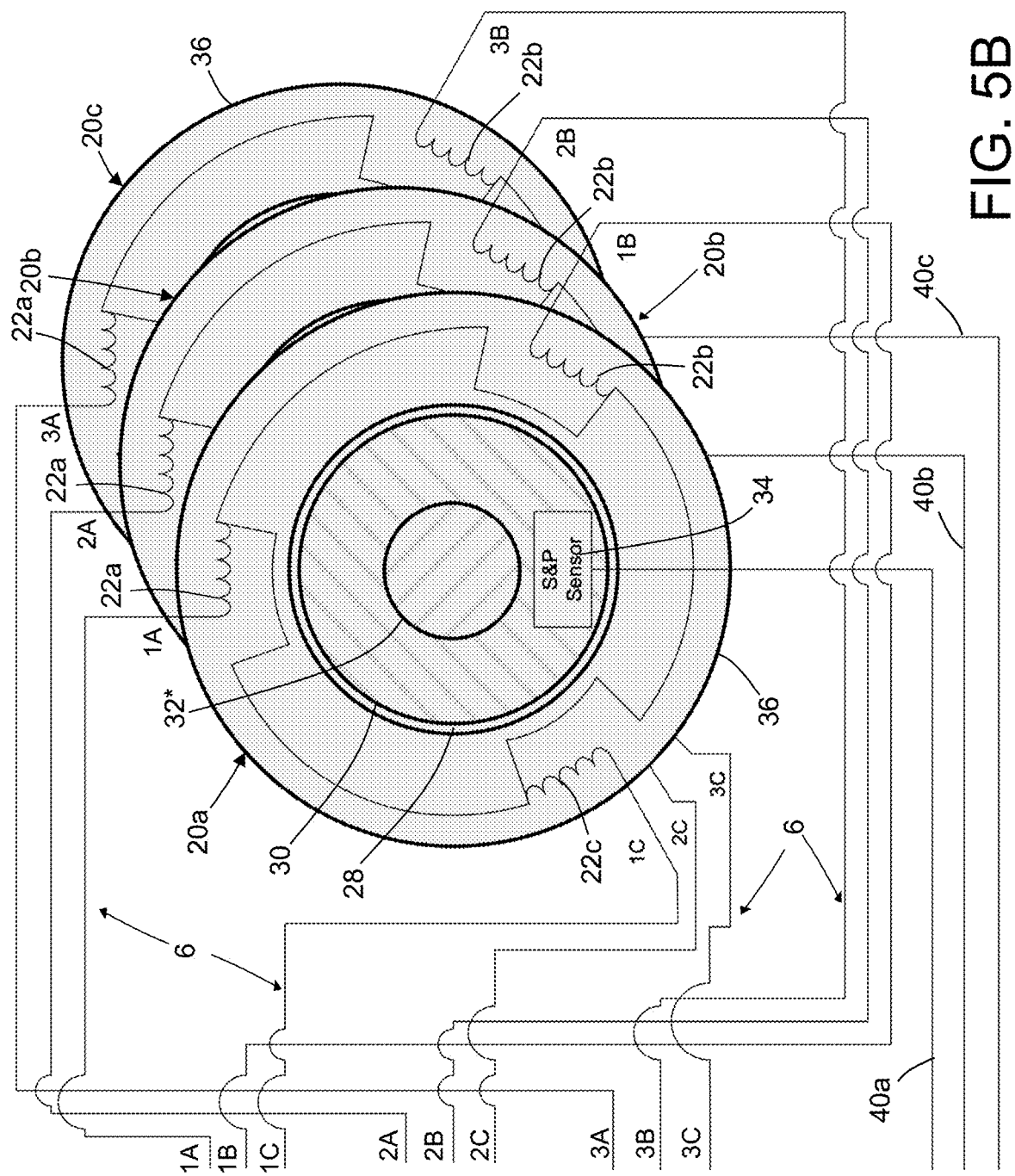

FIGS. 5A and 5B are respective interconnected parts of a diagram representing a system that includes a DC-to-AC converter 50 for powering three co-shafted 3-phase AC motors 20a-20c using interleaved switching of parallel 3-phase inverters 16a-16c in accordance with the second embodiment. The components of DC-to-AC converter 50 and their interconnections are the same as those of converter 2 seen in FIG. 1A.

As seen in FIG. 5B, the system setup includes three 3-phase AC motors 20a-20c installed on a common shaft 32\*. The 3-phase AC motors 20a-20c receive AC power from the inverters 16a-16c respectively via AC power lines 6. Each of the 3-phase AC motors 20a-20c includes a respective rotor 30 mounted to common shaft 32\* and a respective stator 36 separated from the rotor 30 by an air gap 28. Each stator 36 has respective sets of windings 22a-22c (only one winding is shown for each set), which sets of windings are arranged at respective angular positions on the stators 36. The windings 22a-22c of each motor 20a-20c receive respective AC power signals having different phases from respective inverters 16a-16c. Each of the 3-phase AC motors 20a-20c further includes a respective speed and position sensor 34 which detects the speed of rotation and position of rotor 30 and sends respective speed and position signals 40a-40c to inverter controllers 12a-12c respectively.

As seen in FIGS. 5A and 5B, the inverter 16a outputs 3-phase AC power signals 1A, 1B, and 1C which are respectively supplied to respective windings 22a-22c of 3-phase AC motor 20a via respective AC power lines of a first subset of AC power lines 6; the inverter 16b outputs 3-phase AC power signals 2A, 2B, and 2C which are respectively supplied to respective windings 22a-22c of 3-phase AC motor 20b via respective AC power lines of a second subset of AC power lines 6; and the inverter 16c outputs 3-phase AC power signals 3A, 3B, and 3C which are respectively supplied to respective windings 22a-22c of 3-phase AC motor 20c via respective AC power lines of a third subset of AC power lines 6.

The principle of interleaved operation for reducing current ripple, previously described with reference to FIGS. 1A and 1B, is equally applicable to the co-shafted-motor system shown in FIGS. 5A and 5B, assuming all three motors 20a-20c are drawing the same level of power and producing the same torque. The co-shafted-motor system configuration shown in FIGS. 5A and 5B is common for various applications such as propulsion systems and actuation systems. The same benefits (such as the reduced current ripple seen in FIG. 3 and the eliminated or reduced harmonics shown in FIGS. 4A and 4B) would occur in the co-shafted-motor system depicted in FIGS. 5A and 5B.

Figure 6A:
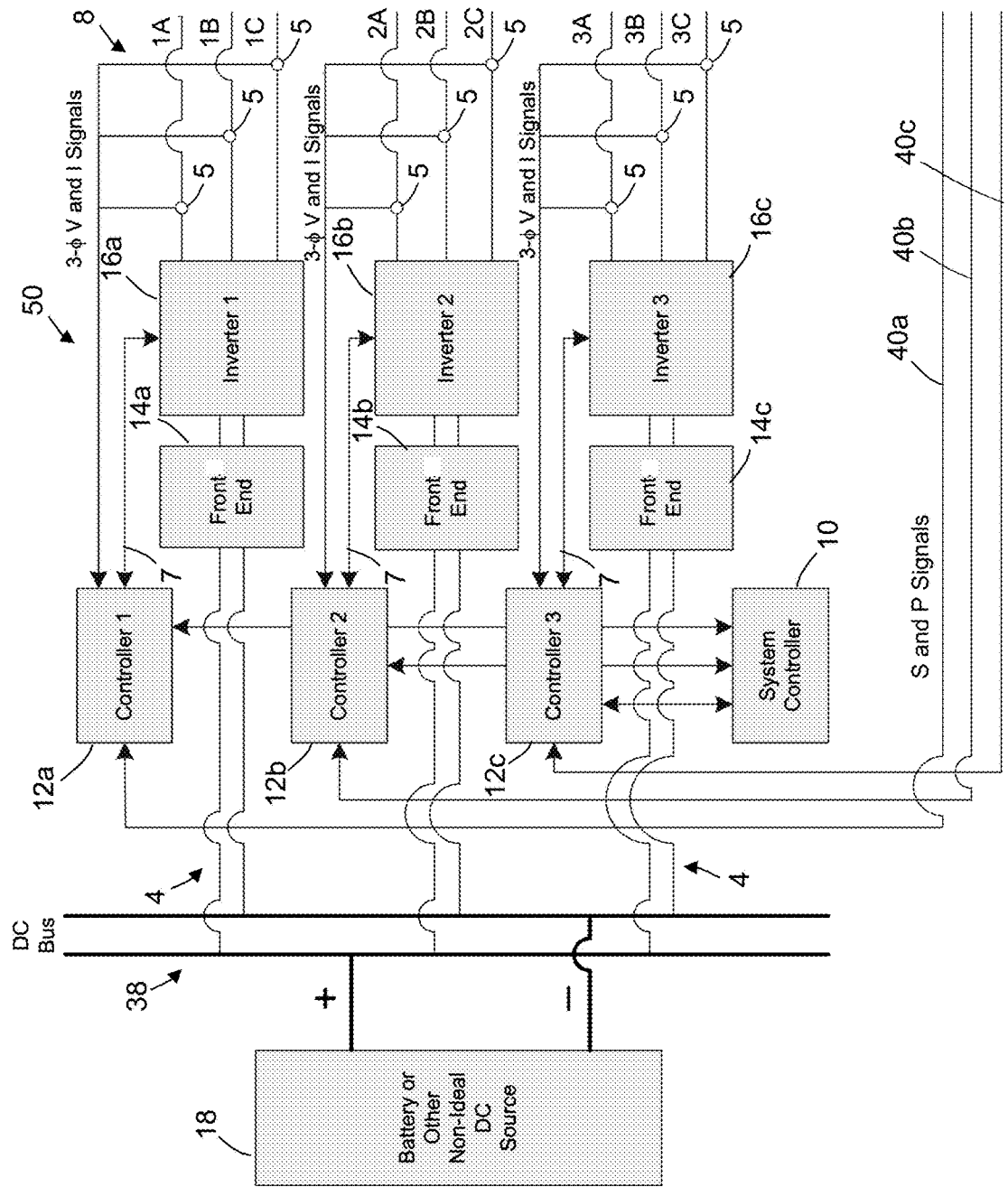
FIGS. 6A and 6B are respective interconnected parts of a diagram representing a system that includes a DC-to-AC converter for powering three separate 3-phase AC motors using interleaved switching of three parallel 3-phase inverters in accordance with the third embodiment.
Figure 6B:
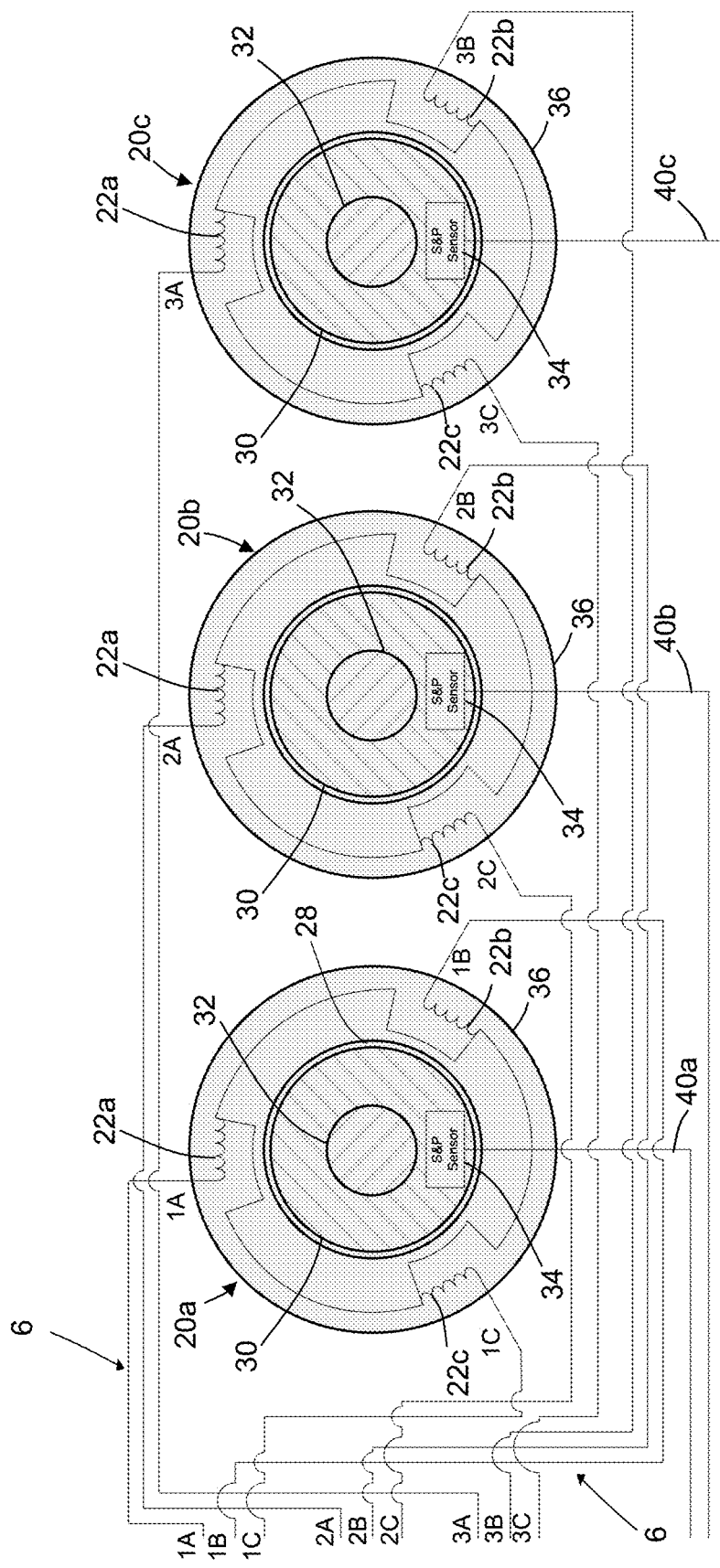

FIGS. 6A and 6B are respective interconnected parts of a diagram representing a system that includes a DC-to-AC converter 50 for powering three separate 3-phase AC motors 20a-20c using interleaved switching of parallel 3-phase inverters 16a-16c in accordance with the third embodiment. The components of DC-to-AC converter 50 and their interconnections are the same as those of converter 2 seen in FIGS. 1A and 5A.

As seen in FIG. 6B, the system setup includes three separate 3-phase AC motors 20a-20c. The 3-phase AC motors 20a-20c receive AC power from the inverters 16a-16c respectively via AC power lines 6. Each of the 3-phase AC motors 20a-20c includes a respective rotor 30 mounted to a respective shaft 32 and a respective stator 36 separated from the rotor 30 by an air gap 28. Each stator 36 has respective sets of windings 22a-22c (only one winding is shown for each set), which sets of windings are arranged at respective angular positions on the stators 36. The windings 22a-22c of each motor 20a-20c receive respective AC power signals having different phases from respective inverters 16a-16c. Each of the 3-phase AC motors 20a-20c further includes a respective speed and position sensor 34 which detects the speed of rotation and position of rotor 30 and sends respective speed and position signals 40a-40c to inverter controllers 12a-12c respectively.

As seen in FIGS. 6A and 6B, the inverter 16a outputs 3-phase AC power signals 1A, 1B, and 1C which are respectively supplied to respective windings 22a-22c of 3-phase AC motor 20a via respective AC power lines of a first subset of AC power lines 6; the inverter 16b outputs 3-phase AC power signals 2A, 2B, and 2C which are respectively supplied to respective windings 22a-22c of 3-phase AC motor 20b via respective AC power lines of a second subset of AC power lines 6; and the inverter 16c outputs 3-phase AC power signals 3A, 3B, and 3C which are respectively supplied to respective windings 22a-22c of 3-phase AC motor 20c via respective AC power lines of a third subset of AC power lines 6.

The principle of interleaved operation for reducing current ripple, previously described with reference to FIGS. 1A and 1B, is equally applicable to the three-motor system shown in FIGS. 6A and 6B, assuming all three motors 20a-20c are drawing the same level of power and producing the same torque. The three-motor system configuration shown in FIGS. 6A and 6B is useful in a distributed propulsion system where multiple motors are mounted on an aircraft wing for the purpose of propulsion and are generally operated at the same power level. The same benefits (such as the reduced current ripple seen in FIG. 3 and the eliminated or reduced harmonics shown in FIGS. 4A and 4B) would occur in the three-motor system depicted in FIGS. 6A and 6B.

The motor drawings in FIGS. 1B, 5B, and 6B are intended for convenience of illustrating an interleaved operation scheme in conjunction with the inverter systems shown in FIGS. 1A, 5A, and 6A, and should not be construed as a representation of an actual design. Specifically, each stator winding depicted in the figure represents a pair or multiple pairs, depending upon a specific motor design, of electromagnetic poles which are typically distributed along the peripheral inner surface of the stator. For example, the phase 1A winding of winding group 21A in FIG. 1B may represent a pair of electromagnetic poles with north and south poles separated by 180 degree along the peripheral inner surface of the stator; similarly, the phase 1B winding of winding group 21B, which is shifted by 120 degree with respect to winding group 21A, may represent a pair of electromagnetic poles with its north and south poles separated by 180 degree along the peripheral inner surface of the stator; and so forth for the phase 1C winding of winding group 21C etc.

The motors 20 and 20a-20c may be of the types used on aircraft to drive actuators for flight control surfaces, for landing gear, or for performing any other appropriate functions or combinations of functions on the aircraft. In other applications, the motor drive a pump, a vehicle drive train, an actuator for performing another function, or any other appropriate load or combination of loads.

The inverter controllers 12a-12c may be implemented using hardware or hardware in combination with software. For example, inverter controllers 12a-12c may be implemented using configurable hardware, a programmable device, or both. Configurable hardware may comprise hardware that is configurable to perform one or more functions of the inverter controller. A programmable device may comprise any device that is programmable to implement one or more functions of the inverter controller. For example, without limitation, the programmable device may comprise a programmable microcontroller or a digital signal processor. The programmable device may be configured to run software or firmware in the form of program instructions to implement one or more functions of the inverter controller. Program instructions may be stored in any appropriate non-transitory tangible computer-readable storage medium for use by, or transfer to, the programmable device.

While systems and methods for current ripple reduction of a DC source powering an AC load have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

The invention claimed is:

1. A system comprising a DC source, a DC bus connected to the DC source, a DC-to-AC converter connected to the DC bus, and an AC motor connected to the DC-to-AC converter, wherein:
the AC motor comprises a stator, a first winding group at a first angular position on the stator, a second winding group at a second angular position on the stator different than first angular position, and a third winding group at a third angular position on the stator different than first and second angular positions;
the DC-to-AC converter comprises first and second inverters connected in parallel to receive direct current from the DC bus;
three phases of the first inverter are connected in sequence to a first winding of the first winding group, to a first winding of the second winding group, and to a first winding of the third winding group;
three phases of the second inverter are connected in sequence to a second winding of the first winding group, to a second winding of the second winding group, and to a second winding of the third winding group;
a first inverter controller configured to control a switch configuration of the first inverter; and
a second inverter controller configured to control a switch configuration of the second inverter.

2. The system as recited in claim 1, wherein:
the first inverter is configured to output first, second, and third AC power signals having respective first, second, and third phases to the first, second, and third winding groups respectively;
the second inverter is configured to output fourth, fifth, and sixth AC power signals having respective fourth, fifth, and sixth phases to the first, second, and third winding groups respectively;
the first through sixth phases are different; and
the first through sixth AC power signals are interleaved.

3. The system as recited in claim 2, further comprising a system controller communicatively coupled to the first and second inverter controllers and configured to supervise and coordinate the first and second inverter controllers so that the first through sixth AC power signals are interleaved.

4. The system as recited in claim 1, wherein:
the DC-to-AC converter further comprises a third inverter connected in parallel with the first and second inverters to receive direct current from the DC bus; and
three phases of the third inverter are connected in sequence to a third winding of the first winding group, to a third winding of the second winding group, and to a third winding of the third winding group.

5. A system comprising a DC source, a DC bus connected to the DC source, a DC-to-AC converter connected to the DC bus, and an AC motor connected to the DC-to-AC converter, wherein:
the AC motor comprises a stator, a first winding group at a first angular position on the stator, a second winding group at a second angular position on the stator different than first angular position, and a third winding group at a third angular position on the stator different than first and second angular positions;
the DC-to-AC converter comprises first and second inverters connected in parallel to receive direct current from the DC bus;
three phases of the first inverter are connected in sequence to a first winding of the first winding group, to a first winding of the second winding group, and to a first winding of the third winding group;
three phases of the second inverter are connected in sequence to a second winding of the first winding group, to a second winding of the second winding group, and to a second winding of the third winding group;
the DC-to-AC converter further comprises a third inverter connected in parallel with the first and second inverters to receive direct current from the DC bus;
three phases of the third inverter are connected in sequence to a third winding of the first winding group, to a third winding of the second winding group, and to a third winding of the third winding group; and the system further comprises:
a first inverter controller configured to control a switch configuration of the first inverter;
a second inverter controller configured to control a switch configuration of the second inverter; and
a third inverter controller configured to control a switch configuration of the third inverter.

6. The system as recited in claim 5, wherein:
the first inverter is configured to output first, second, and third AC power signals having respective first, second, and third phases to the first, second, and third winding groups respectively;
the second inverter is configured to output fourth, fifth, and sixth AC power signals having respective fourth, fifth, and sixth phases to the first, second, and third winding groups respectively;
the third inverter is configured to output seventh, eighth, and ninth AC power signals having respective seventh, eighth, and ninth phases to the first, second, and third winding groups respectively;
the first through ninth phases are different; and
the first through ninth AC power signals are interleaved.

7. The system as recited in claim 6, further comprising a system controller communicatively coupled to the first, second, and third inverter controllers and configured to supervise and coordinate the first, second, and third inverter controllers so that the first through ninth AC power signals are interleaved.

8. The system as recited in claim 7, wherein the AC motor further comprises a shaft and a rotor mounted to the shaft, and the rotor is driven to rotate by electromagnetic inductive coupling with the stator in response to receipt of the first through ninth AC power signals.

9. A system comprising a DC source, a DC bus connected to the DC source, a DC-to-AC converter connected to the DC bus, and first and second AC motors connected to the DC-to-AC converter, wherein:
the first AC motor comprises a first stator and first, second, and third windings disposed at first, second, and third angular positions respectively on the first stator;
the second AC motor comprises a second stator and first, second, and third windings disposed at first, second, and third angular positions respectively on the second stator;

the DC-to-AC converter comprises first and second inverters connected in parallel to receive direct current from the DC bus;

the first inverter is connected to the first, second, and third windings on the first stator;

the second inverter is connected to the first, second, and third windings on the second stator, and the system further comprising:

a first inverter controller configured to control a switch configuration of the first inverter; and a second inverter controller configured to control a switch configuration of the second inverter.

10. The system as recited in claim 9, wherein:

the first inverter is configured to output first, second, and third AC power signals having respective first, second, and third phases to the first, second, and third windings respectively on the first stator;

the second inverter is configured to output fourth, fifth, and sixth AC power signals having respective fourth, fifth, and sixth phases to the first, second, and third windings respectively on the second stator;

the first through sixth phases are different; and the first through sixth AC power signals are interleaved.

11. The system as recited in claim 10, further comprising a system controller communicatively coupled to the first and second inverter controllers and configured to supervise and coordinate the first and second inverter controllers so that the first through sixth AC power signals are interleaved.

12. The system as recited in claim 9, further comprising a third AC motor, wherein:

the third AC motor comprises a third stator and first, second, and third windings disposed at first, second, and third angular positions respectively on the third stator;

the DC-to-AC converter further comprises a third inverter connected in parallel with the first and second inverters to receive direct current from the DC bus; and the third inverter is connected to the first, second, and third windings on the third stator.

13. The system as recited in claim 12, further comprising:

a first inverter controller configured to control a switch configuration of the first inverter;

a second inverter controller configured to control a switch configuration of the second inverter; and a third inverter controller configured to control a switch configuration of the third inverter.

14. The system as recited in claim 13, wherein:

the first inverter is configured to output first, second, and third AC power signals having respective first, second, and third phases to the first, second, and third windings respectively on the first stator;

the second inverter is configured to output fourth, fifth, and sixth AC power signals having respective fourth, fifth, and sixth phases to the first, second, and third windings respectively on the second stator;

the third inverter is configured to output seventh, eighth, and ninth AC power signals having respective seventh, eighth, and ninth phases to the first, second, and third windings respectively on the third stator;

the first through ninth phases are different; and the first through ninth AC power signals are interleaved.

15. The system as recited in claim 14, further comprising a system controller communicatively coupled to the first, second, and third inverter controllers and configured to supervise and coordinate the first, second, and third inverter controllers so that the first through ninth AC power signals are interleaved.

16. The system as recited in claim 15, wherein:

the first, second, and third AC motors further comprise a common shaft;

the first AC motor further comprises a first rotor mounted to the common shaft;

the second AC motor further comprises a second rotor mounted to the common shaft;

the third AC motor further comprises a third rotor mounted to the common shaft; and the common shaft is driven to rotate by electromagnetic inductive coupling of the first, second, and third rotors with the first, second, and third stators respectively in response to receipt of the first through third AC power signals, fourth through AC power signals, and sixth through ninth AC power signals respectively.

17. The system as recited in claim 15, wherein:

the first AC motor further comprises a first shaft and a first rotor mounted to the first shaft, and the first rotor is driven to rotate by electromagnetic inductive coupling with the first stator in response to receipt of the first through third AC power signals;

the second AC motor further comprises a second shaft and a second rotor mounted to the second shaft, and the second rotor is driven to rotate by electromagnetic inductive coupling with the second stator in response to receipt of the fourth through sixth AC power signals; and the third AC motor further comprises a third shaft and a third rotor mounted to the third shaft, and the third rotor is driven to rotate by electromagnetic inductive coupling with the third stator in response to receipt of the seventh through ninth AC power signals.

18. A method for providing AC power to motors, the method comprising:

connecting a DC source to a DC bus;

connecting first through third inverters in parallel to the DC bus and to windings of first through third 3-phase AC motors respectively;

controlling switches inside the first inverter to convert a DC power signal into first through third AC power signals having a same amplitude and shifted in phase by 120 degrees with respect to each other;

supplying the first through third AC power signals to first, second and third windings respectively of the first 3-phase AC motor;

controlling switches inside the second inverter to convert the DC power signal into fourth through sixth AC power signals having the same amplitude and shifted in phase by 120 degrees with respect to each other and by 40 degrees with respect to the first through third AC power signals;

supplying the fourth through sixth AC power signals to first, second and third windings respectively of the second 3-phase AC motor;

controlling switches inside the third inverter to convert the DC power signal into seventh through ninth AC power signals having the same amplitude and shifted in phase by 120 degrees with respect to each other, by 80 degrees with respect to the first through third AC power signals, and by 40 degrees with respect to the fourth through sixth AC power signals; and supplying the seventh through ninth AC power signals to first, second and third windings respectively of the third 3-phase AC motor.

19. The method as recited in claim 18, further comprising mounting respective rotors of the first through third 3-phase AC motors to a common shaft.

20. A method for providing AC power a motor, the method comprising:
- connecting a DC source to a DC bus;
- connecting first through third inverters in parallel to the DC bus and to windings of first through third winding groups disposed at first, second and third angular positions respectively on a stator of a 3-phase AC motor disposed;
- controlling switches inside the first inverter to convert a DC power signal into first through third AC power signals having a same amplitude and shifted in phase by 120 degrees with respect to each other;
- supplying the first through third AC power signals to first, second and third windings respectively of the first winding group;
- controlling switches inside the second inverter to convert the DC power signal into fourth through sixth AC power signals having the same amplitude and shifted in phase by 120 degrees with respect to each other and by 40 degrees with respect to the first through third AC power signals;
- supplying the fourth through sixth AC power signals to first, second and third windings respectively of the second winding group;
- controlling switches inside the third inverter to convert the DC power signal into seventh through ninth AC power signals having the same amplitude and shifted in phase by 120 degrees with respect to each other, by 80 degrees with respect to the first through third AC power signals, and by 40 degrees with respect to the fourth through sixth AC power signals; and
- supplying the seventh through ninth AC power signals to first, second and third windings respectively of the third winding group.

* * * * *